UNITED STATES PATENT OFFICE 2,572,001

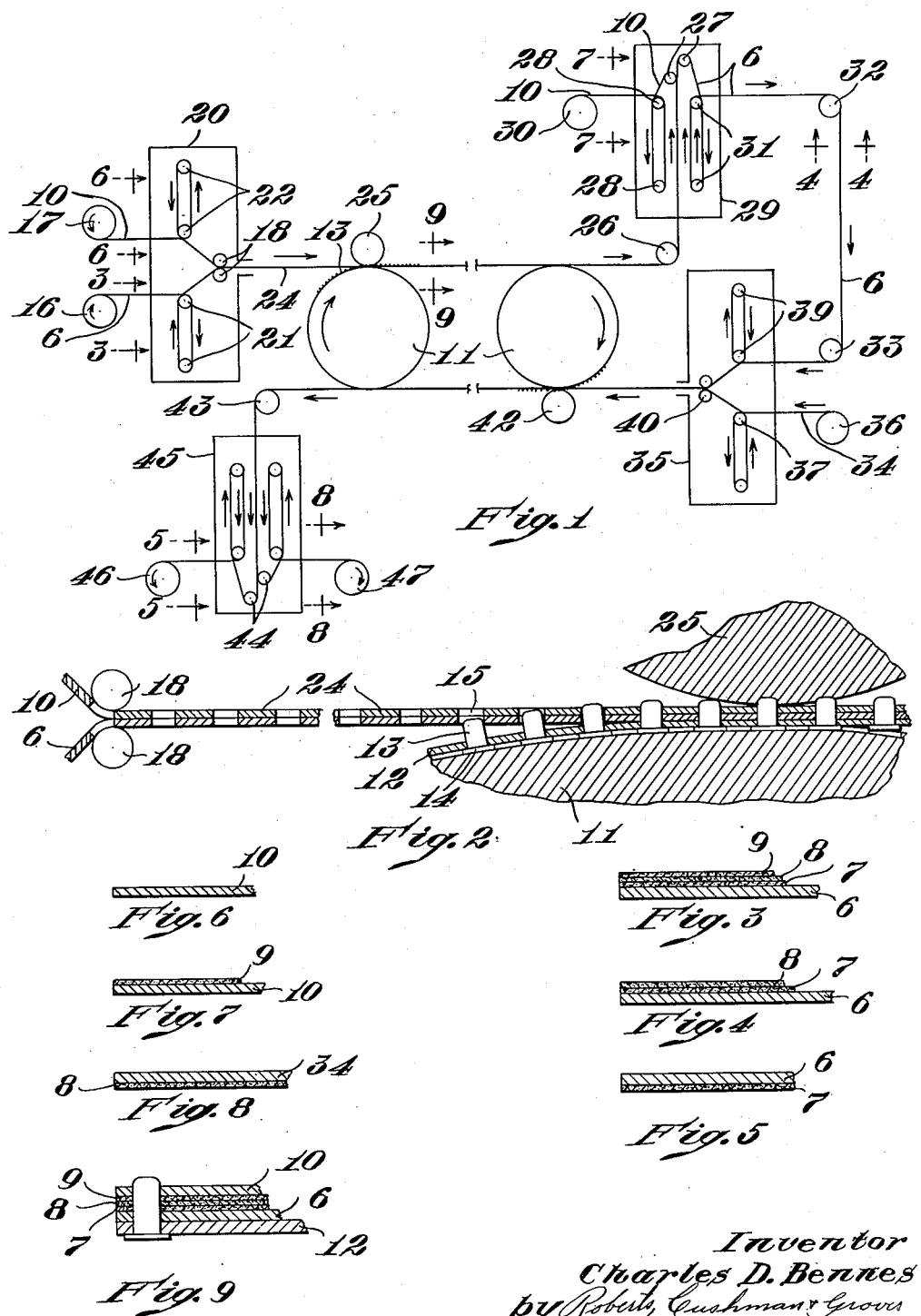

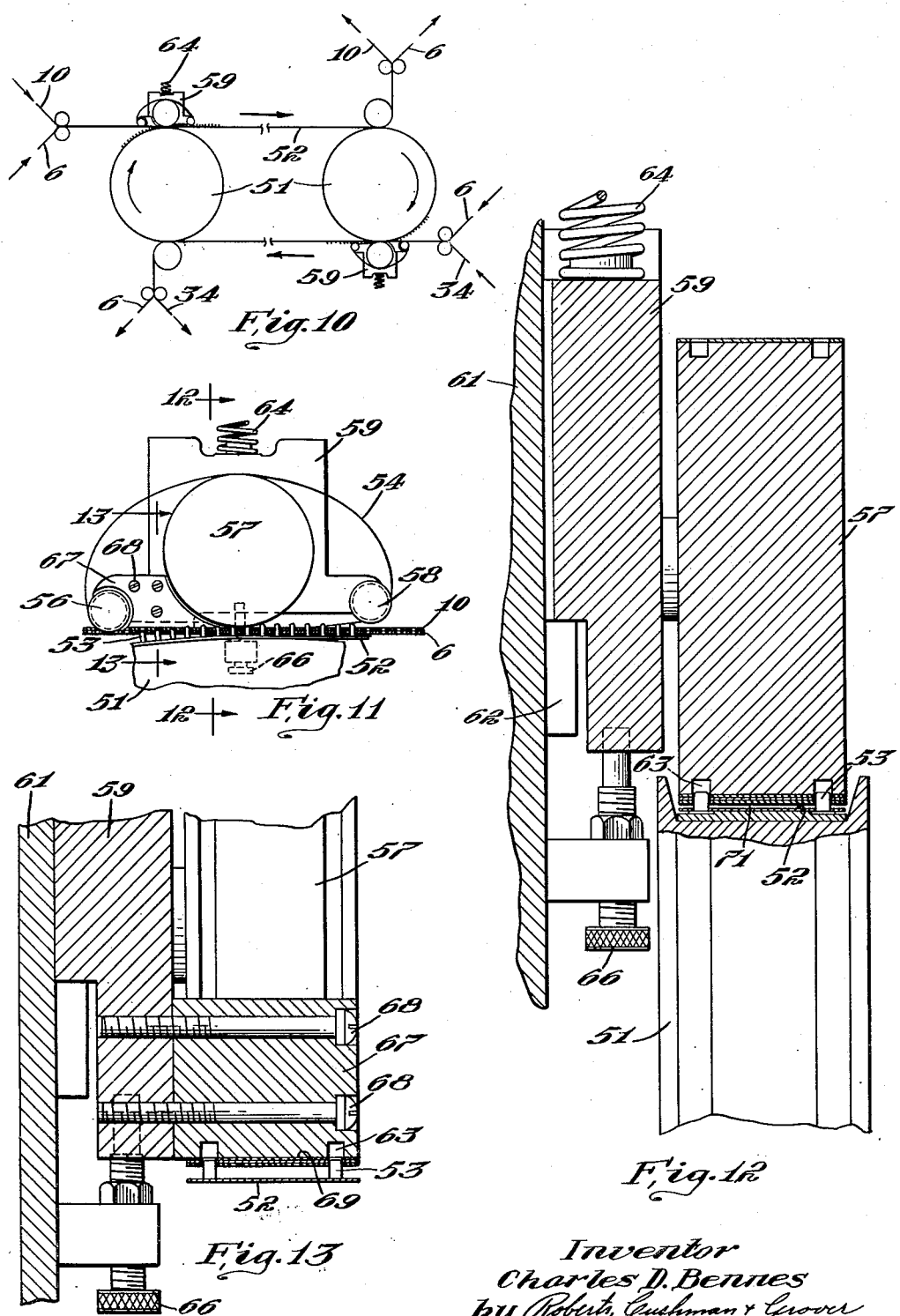

METHOD AND APPARATUS FOR TRANSFERRING PICTURE LAYERS FROM ONE FILM BASE TO ANOTHER

Charles D. Bennes, Los Angeles, Calif., assignor to Technicolor Motion Picture Corporation, Hollywood, Calif., a corporation of Maine Application January 3, 1949, Serial No. 68,925

25 Claims. (Cl. 154—98)

In the art of cinematography it is often desirable to bring two or more films together in mutual contact on an endless belt or other carrier having a succession of register teeth which engage in the sprocket holes of the film to hold the films in precise registration. For example, in producing motion pictures in color, it is desirable to have the differently sensitized layers of emulsion superposed on a single film so as to avoid the necessity of using a special multiple film camera, but after the emulsion layers are exposed and developed it is desirable to transfer them from the multilayer film base to another base. In this film stripping process the multilayer film and the transfer base are carried in superposition on a carrier having a succession of register teeth and traveling in an orbital path, and the emulsion layer to be transferred is loosened from the multilayer base and adhesively joined to the new base while the two films are traveling together. Another example is found in imbibition printing where it is customary to press a dye-soaked matrix against an imbibition blank and feed them together on a carrier having register teeth to hold them in precise register while traveling together.

Heretofore considerable difficulty has been experienced in feeding the two films in superposition on a pin belt or other toothed carrier without damaging the films or the coatings on the film or blurring the pictures. This is particularly true when the coatings on the films have been softened and rendered more or less tacky before the films are fed to the carrier.

Objects of the present invention are to feed two films in superposition on a pin belt or other toothed carrier without damaging either the films or the coatings thereon and without distorting or blurring the pictures carried by the coatings.

In one aspect the present invention involves a method of simultaneously registering a plurality of films on an endless belt or other carrier traveling in an orbital path and having a succession of register teeth engaging the sprocket holes of the films, the method consisting in bringing the films together in contact with their sprocket holes substantially in register, then feeding the films along a rectilinear path which approaches the orbit of the toothed carrier tangentially, and in the rectilinear path inserting the register teeth in the sprocket holes of the films so that from the time the films are brought together until they are on the toothed carrier they have traveled in a path which has no substantial curvature.

In a more specific aspect the method involves bringing the films together with their sprocket holes substantially in register, and then feeding the superposed films along a rectilinear path which approaches tangentially a curved part of the orbital path of the carrier and then inserting the register teeth in the sprocket holes. In a still more specific aspect the films are brought together in mutual contact with their sprocket holes substantially in register and then fed along a rectilinear path which approaches the convex path of the toothed carrier tangentially and which is also codirectional with the path of the carrier and the films beyond the point where the films are on the carrier.

In another aspect the present invention is concerned with a film stripping process wherein a multilayer film base is adhesively joined to a transfer film base, the adhesion between the emulsion layer and the original base weakened and the emulsion layer and the original base peeled apart, and comprises the method of bringing the multilayer film and the transfer film together in mutual contact with their sprocket holes substantially in register and then feeding the superposed film along a rectilinear path which approaches the path of the toothed carrier substantially tangentially, so that from the time the films are brought together until they are on the toothed carrier their path has no substantial curvature.

In a still more specific aspect the register teeth are not fully inserted in the sprocket holes of the films. On the contrary a slight clearance is left between the carrier and the back of the next adjacent film. While this clearance may vary, ordinarily a clearance of the order of five-thousandths of an inch is sufficient.

In a still further aspect the apparatus involves a backing belt for pressing the films on the register teeth, the backing belt having perforations to receive the tips of the register teeth. The backing belt is trained over rollers at spaced locations along the path of the films in the region where the films meet the carrier and intermediate the backing rollers the backing belt may be yieldingly or non-yieldingly backed with a solid backing, the backing belt sliding over the solid backing.

For the purposes of illustration a typical embodiment of the invention is illustrated in the accompanying drawings in which:

Fig. 1 is a diagrammatic view of stripping apparatus for transferring the picture layers of a composite film to separate film bases to form color-separation films;

Fig. 2 is an enlarged view of that portion of Fig. 1 where the two films are brought together and fed onto the toothed carrier;

Figs. 3 to 9 inclusive are sections on lines 3 to 9 of Fig. 1, parts being broken away;

Various details of construction of parts of the apparatus diagrammatically represented in the drawings are disclosed in the prior patents 1,675,743; 1,704,328; 1,707,695; 1,707,699; 1,707,710; 1,707,733; 1,928,714; 2,257,254; 2,271,572; and 2,369,176.

Fig. 10 is a diagram like Fig. 1 showing a preferred embodiment;

Fig. 11 is an enlarged detail of a part of the preferred embodiment;

Fig. 12 is a section on line 12—12 of Fig. 11; and

Fig. 13 is a section on line 13—13 of Fig. 11.

One type of multilayer of composite film suitable for use on the stripping machine of Fig. 1 is illustrated in Fig. 3.

This type comprises an ordinary base 6 with three layers of emulsion 7, 8 and 9, the layer 7 being permanently mounted on the base in the usual way, the layer 8 being mounted on the layer 7 with an alcohol soluble adhesive and the layer 9 being mounted on the layer 8 with a water soluble adhesive. With this arrangement the layer 9 may be loosened with water without loosening the layer 8, and the layer 8 may be subsequently removed without loosening the layer 7. However, it will be understood that the present invention, at least in its broader aspects, is independent of the particular construction of the composite film. The separate base material 10 to which the layers of emulsion are to be transferred may comprise ordinary cinematographic film base (Fig. 6).

The particular embodiment of the invention shown in Figs. 1 and 2 comprises two drums or sheaves 11 over which is trained an endless belt 12 along the margins of which are mounted rows of register pins or teeth 13 adapted to fit into the sprocket holes of the films. While the pins may be mounted on the belt in various ways they are preferably fitted into perforations in the belt corresponding to the perforations in the film with heads 14 seating against the back of the belt. Preferably both the belt and pins are formed of metal and the heads 14 are soldered to the back of the belt.

As shown in Fig. 1 the composite film 6, with layers 7, 8 and 9, is fed into the machine from the reel 16 and the uncoated base material 10 is fed from the reel 17, the films 6 and 10 being fed to the belt between a pair of rollers 18 which bring the two films substantially together. In transit to the rollers 18 the composite film feeds through a water tank 20 to moisten the adhesive between the layers 8 and 9, the film zigzagging back and forth over opposed pairs of guide rolls 21 to afford time for the water to be absorbed by the picture layer, which is ordinarily formed of gelatin or the like. The time required for the film to pass through the water bath may be only long enough to moisten the picture layer, the film leaving the tank before any water has penetrated to the first adhesive layer, or it may be long enough to soften the adhesive somewhat but not sufficiently for the layer to become displaced before the composite film is seated on the belt. Inasmuch as the film may be expanded slightly by the water the base 10 is subjected to similar treatment by zigzagging back and forth over similar sets of rollers 22 so that the two films are equally affected. The belt enters and leaves the water tank through narrow slits which permit only a small amount of leakage, this leakage being continuously replaced by suitable supply means.

After emerging from the tanks and leaving the rolls 18 the films travel to another roller 25 which seats them upon the pin belt 12 at the point where the pin belt 12 leaves the drum 11 tangentially. The films may be seated tightly on the carrier 12 or with a slight celarance between the carrier and the back of the adjacent film. They then travel with the belt a sufficient distance for the top layer 9 to adhere more firmly to the new base 10 than to the underlying layer 8, the layer 9 gradually loosening from the old base as the water in the outer picture layer migrates to the adhesive layer and adhering to the new base by virtue of the tacky nature of the gelatin or other material constituted in the layer as a result of the previous water treatment. Thus as the films travel together on the belt they are held in exact registration by the pins on the belt while the layer 9 is transferred from the composite film to the base 10.

After the layer 9 has become firmly attached to the new base both films are fed from the belt over a roller 26 between a pair of rollers 27 where the two films are peeled apart, the composite films 6 with its remaining layers 7 and 8 (Fig. 4) feeding to the right, and the base 10 with the layer 9 (Fig. 7) feeding to the left. The film 10 loops back and forth over pairs of guide rolls 28 in a drying compartment 29 until the film is dry and then it feeds out to a takeup roll 30. The composite film 6 loops back and forth over pairs of guide rolls 31 in the drying compartment and then feeds over guide rolls 32 and 33 to a second station where it is fed back to the belt in superposed relationship to a new base 34 to which the layer 8 is to be transferred.

At the second station a tank 35 corresponding to tank 20 at the first station is arranged to wet both films in like manner. If the layer 8 is joined to the layer 7 by means of an alcohol soluble adhesive, the tank 35 contains alcohol. The blank film 34 feeds into the tank from a feed roll 36, then loops back and forth over a pair of guide rolls 37 and then feeds to the rollers 40 where it is brought together with composite film 6. The composite film 6 loops back and forth over pairs of guide rolls 39 and then feeds to the rolls 40. From these rolls the two superposed films are fed onto the pin belt between roll 42 and the drum 11, and thence along the pin belt a distance sufficiently long to permit the layer 8 to become firmly attached to the new base 34, whereupon the two films feed from the belt over the guide roll 43 to a pair of guide rolls 44 where the two films are peeled apart. The composite film 6 with only layer 7 remaining thereon (Fig. 5) feeds to the left through the drying compartment 45 and thence to a takeup reel 46, and the base 34 with the layer 8 adhering thereto (Fig. 8) feeds to the right through the drying compartment and thence to the takeup roll 47. Thus the composite film of Fig. 3 is converted into the three color separation films shown in Figs. 5, 7 and 8.

Thus in the illustration the two films are brought together with their sprocket holes substantially in register and then fed linearly so that their path approaches the pin belt tangentially and so that the approach path is codirectional with the path followed by the pin belt and films beyond the point where the films are seated on the pin belt. The multilayer film 6 and the transfer film 10 are brought together between rolls 18 in intimate contact and substantial register with each other. From this point the two films travel along a rectilinear path and are seated on the pin belt 12 by the seating roll 25 as the pin belt, which travels around the drum 11, passes over the top of the drum. The linear path 24 of the two films approaches the circular path of the pin belt tangentially. As the films 6 and 10 are brought together between rolls 18 they enter the rectilinear path and continue to travel linearly as the teeth 13 engage their sprocket holes 15. Since the path between the rolls 18 and the rolls 25 contains no curved portion, the sprocket holes of the two films are at all times substantially in register, and as the films are seated on the belt there is no tendency for the films to shift relatively to each other so as to disrupt the adhesive bond between them. Further, the pins 13 exert an equal force on each film so that no distortion or displacement of the emulsion occurs.

The embodiment shown in Figs. 10 to 13 comprises two drums 51 and an endless pin-belt 52 corresponding to the parts 11 and 12 in the first embodiment, and the films 6, 10 and 34 are fed to and from the belt 52 as before. The only difference between the two embodiments is the means for pressing the films on the register teeth 53 of the register belt 52.

This seating means comprises an endless belt 54 of thin Monel metal perforated like motion picture film to receive the projecting ends of the teeth 53. The belt 54 is trained around three rollers 56, 57 and 58 journaled on a block 59 which is mounted for vertical movement on a support 61 by means of sliding gibs 62. As shown in Figs. 12 and 13 the roller 57 has two peripheral grooves 63 to receive the projecting ends of the teeth 53. The block 59 is yieldingly urged downwardly by means of a spring 64 and an adjustable stop 66 limits the downward movement of the block. Mounted on the lower end of the block 59 is a shoe 67 which is secured by screw 68, the shoe 67 having a lower face 69 which aligns with the lowermost points of the rollers 56, 57 and 58 to serve as a backing for the belt 54.

In operation the stop 66 is so adjusted that the gap between the rollers 51 and 57 is about five-thousandths of an inch greater than the combined thickness of the register belt 52, the two films and the backing belt 54. Thus the films are not seated tightly against the belt 52 but are only pressed down to the point where there is a clearance 71 (Fig. 12) between the belt 52 and the back of film 6. In this way the emulsions of the films are not distorted by pressure around the pins 53. When a splice between two films passes into the machine the block 59 rises against the action of spring 64 to permit the splice to pass. As the pins enter the films the latter are backed by the belt 54 which in turn is backed by the rollers 56, 57 and 58 and the shoe 67. As in the first embodiment the films 6 and 10 are substantially straight and are in registered contact in the region where the teeth 53 are inserted.

It should be understood that the present disclosure is for the purpose of illustration only and that this invention includes all modifications and equivalents which fall within the scope of the appended claims.

This application is in part a continuation of application Serial No. 788,891 filed November 29, 1947.

I claim:

1. In the art of feeding a plurality of cinematographic films on a carrier having teeth fitting the sprocket holes of the film to hold them in register with each other, the method which comprises bringing the films together in superposed contact with their sprocket holes substantially in register, feeding the superposed films along a rectilinear path from the point where the films are brought together to the point where the films are supported by the carrier, said rectilinear path being substantially tangential to the path of the carrier at the latter point, and in said rectilinear path inserting said teeth in said sprocket holes, leaving a slight clearance between the films and carrier.

2. In the art of feeding a plurality of cinematographic films on a carrier having teeth fitting the sprocket holes of the film to hold them in register with each other, the method which comprises causing said teeth to travel in an orbital path at least a portion of which is curved, bringing the films together in superposed contact with their sprocket holes substantially in register before they reach the carrier, feeding the superposed films along a rectilinear path from the point where the films are brought together to a point in said curved portion where the films are supported by the carrier, said rectilinear path being substantially tangential to said curved portion, and in said rectilinear path inserting said teeth in said sprocket holes, leaving a slight clearance between the films and carrier.

3. In the art of feeding a plurality of cinematographic films on a carrier having teeth fitting the sprocket holes of the film to hold them in register with each other, the method which comprises causing said teeth to travel in an orbital path at least a portion of which is curved and a succeeding portion relatively straight, bringing the films together in superposed contact with their sprocket holes substantially in register before they reach the carrier, feeding the superposed films along a rectilinear path from the point where the films are brought together to a point in said curved portion where the films are supported by the carrier, said rectilinear path being substantially tangential to said curved portion and codirectional with said relatively straight portion, and in said rectilinear path inserting said teeth in said sprocket holes, leaving a slight clearance between the films and carrier.

4. In the art of feeding a plurality of cinematographic films on a carrier having teeth fitting the sprocket holes of the film to hold them in register with each other, the method which comprises bringing the films together in superposed contact with their sprocket holes substantially in register, feeding the superposed films along a rectilinear path from the point where the films are brought together to the point where the films are supported by the carrier, said rectilinear path being substantially tangential to the path of the carrier at the latter point, in said rectilinear path inserting said teeth in said sprocket holes, and pressing the films part way down the teeth, leaving a slight clearance between the film and carrier.

5. In the art of feeding a plurality of cinematographic films on a carrier having teeth fitting the sprocket holes of the film to hold them in register with each other, the method which comprises causing said teeth to travel in an orbital path at least a portion of which is curved, bringing the films together in superposed contact with their sprocket holes substantially in register before they reach the carrier, feeding the superposed films along a recti-linear path from the point where the films are brought together to a point in said curved portion where the films are supported by the carrier, said rectilinear path being substantially tangential to said curved portion, in said rectilinear path inserting said teeth in said sprocket holes, and pressing the films part way down the teeth, leaving a slight clearance between the films and carrier.

6. In the art of feeding a plurality of cinematographic films on a carrier having teeth fitting the sprocket holes of the film to hold them in register with each other, the method which comprises causing said teeth to travel in an orbital path at least a portion of which is curved and a succeeding portion relatively straight, bringing the films together in superposed contact with their sprocket holes substantially in register before they reach the carrier, feeding the superposed films along a rectilinear path from the point where the films are brought together to a point in said curved portion where the films are supported by the carrier, said rectilinear path being substantially tangential to said curved portion and codirectional with said relatively straight portion, in said rectilinear path inserting said teeth in said sprocket holes, and pressing the films part way down the teeth, leaving a slight clearance between the films and carrier.

7. Cinematographic apparatus comprising a carrier having teeth fitting the sprocket holes of films to hold them in register with each other, means for feeding the films together in superposed contact with their sprocket holes substantially in register and thence along a rectilinear path substantially tangential to the carrier so that the carrier teeth enter the sprocket holes of the films in said rectilinear path as the films approach the carrier, and backing means approximately parallel with said path for counteracting the thrust of the teeth as they enter the sprocket holes.

8. Cinematographic apparatus comprising a carrier having teeth fitting the sprocket holes of films to hold them in register with each other, means for feeding the films together in superposed contact with their sprocket holes substantially in register and thence along a rectilinear path substantially tangential to the carrier so that the carrier teeth enter the sprocket holes of the films in said rectilinear path as the films approach the carrier, and backing means approximately parallel with said path for counteracting the thrust of the teeth as they enter the sprocket holes, said backing means including a belt having perforations to receive the tips of the teeth.

9. Cinematographic apparatus comprising a carrier having teeth fitting the sprocket holes of films to hold them in register with each other, means for feeding the films together in superposed contact with their sprocket holes substantially in register and thence along a rectilinear path substantially tangential to the carrier so that the carrier teeth enter the sprocket holes of the films in said rectilinear path as the films approach the carrier, backing rollers at spaced locations along said path and means including a belt trained over said rollers to travel approximately parallel with said path for counteracting the thrust of the teeth as they enter said sprocket holes.

10. Cinematographic apparatus comprising a carrier having teeth fitting the sprocket holes of films to hold them in register with each other, means for feeding the films together in superposed contact with their sprocket holes substantially in register and thence along a rectilinear path substantially tangential to the carrier so that the carrier teeth enter the sprocket holes of the films in said rectilinear path as the films approach the carrier, backing rollers at spaced locations along said path, and means including a belt trained over said rollers to travel approximately parallel with said path for counteracting the thrust of the teeth as they enter the sprocket holes, said belt having sprocket holes to receive the projecting tips of the teeth.

11. Cinematographic apparatus comprising an endless belt having teeth fitting the sprocket holes of films to hold them in register with each other, means for feeding the belt along an orbital path comprising a convex portion and a succeeding relatively straight portion, means for feeding the films together in superposed contact with their sprocket holes substantially in register and thence along a rectilinear path substantially tangential to the said convex portion and in substantial alignment with said straight portion so that the belt teeth enter the sprocket holes of the films in said rectilinear path as the films approach the belt, and backing means approximately parallel with said path for counteracting the thrust of the teeth as they enter the sprocket holes.

12. Cinematographic apparatus comprising an endless belt having teeth fitting the sprocket holes of films to hold them in register with each other, means for feeding the belt along an orbital path comprising a convex portion and a succeeding relatively straight portion, means for feeding the films together in superposed contact with their sprocket holes substantially in register and thence along a rectilinear path substantially tangential to the said convex portion and in substantial alignment with said straight portion so that the belt teeth enter the sprocket holes of the films in said rectilinear path as the films approach the belt, backing rollers at spaced locations along said path, and means including another belt trained over said rollers to travel approximately parallel with said path for counteracting the thrust of the teeth as they enter the sprocket holes.

13. Cinematographic apparatus comprising an endless belt having teeth fitting the sprocket holes of films to hold them in register with each other, means for feeding the belt along an orbital path comprising a convex portion and a succeeding relatively straight portion, means for feeding the films together in superposed contact with their sprocket holes substantially in register and thence along a rectilinear path substantially tangential to the said curved portion and in substantial alignment with said straight portion so that the belt teeth enter the sprocket holes of the films in said rectilinear path as the films approach the belt, backing rollers at spaced locations along said path, and means including another belt trained over said rollers to travel approximately parallel with said path for counteracting the thrust of the teeth as they enter the sprocket holes, said belt having sprocket holes to receive the projecting tips of the teeth.

14. Cinematographic apparatus comprising a carrier having teeth fitting the sprocket holes of films to hold them in registry with each other, the teeth traveling in an orbital path including a straight portion, and means for guiding said films into contact with each other at a point in alignment with said straight portion and spaced therefrom, whereby the films continue to travel in the same straight path while said teeth enter said sprocket holes.

15. Cinematographic apparatus comprising a carrier having teeth fitting the sprocket holes of films to hold them in registry with each other, the teeth traveling in an orbital path including a straight portion, and means for guiding said films into contact with each other before they reach said path, said means including guides separated by a space substantially equal to the combined thickness of the films, said space being in alignment with said straight portion, whereby the films continue to travel in the same straight path while said teeth enter the sprocket holes.

16. Cinematographic apparatus comprising a carrier having teeth fitting the sprocket holes of films to hold them in registry with each other, the teeth traveling in an orbit, means for feeding the films to said teeth along a path tangential to said orbit, means for guiding the films into contact with each other at a point in said tangential path before the films reach said teeth, and backing means approximately parallel with said path for counteracting the thrust of the teeth as they enter the sprocket holes, whereby the films continue to travel in the same straight path while said teeth enter the sprocket holes.

17. Cinematographic apparatus comprising a carrier having teeth fitting the sprocket holes of films to hold them in registry with each other, the teeth traveling in an orbital path including a straight portion, means for guiding said films into contact with each other at a point in alignment with said straight portion and spaced therefrom, and backing means approximately parallel with said path for counteracting the thrust of the teeth as they enter the sprocket holes, whereby the films continue to travel in the same straight path while said teeth enter said sprocket holes.

18. Cinematographic apparatus comprising a carrier having teeth fitting the sprocket holes of films to hold them in registry with each other, the teeth traveling in an orbital path including a straight portion, means for guiding said films into contact with each other before they reach said path, said means including guides separated by a space substantially equal to the combined thickness of the films, said space being in alignment with said straight portion, and backing means approximately parallel with said path for counteracting the thrust of the teeth as they enter the sprocket holes, whereby the films continue to travel in the same straight path while said teeth enter said sprocket holes.

19. Cinematographic apparatus comprising a carrier having teeth fitting the sprocket holes of films to hold them in registry with each other, the teeth traveling in an orbit, means for feeding the films to said teeth along a path tangential to said orbit, means for guiding the films into contact with each other at a point in said tangential path before the films reach said teeth, and backing means approximately parallel with said path for counteracting the thrust of the teeth as they enter the sprocket holes, said backing means being spaced from the carrier a distance greater than the combined thickness of the films, whereby the films are pressed only part way down the teeth, leaving a slight clearance between the films and carrier.

20. Cinematographic apparatus comprising a carrier having teeth fitting the sprocket holes of films to hold them in registry with each other, the teeth traveling in an orbital path including a straight portion, means for guiding said films into contact with each other at a point in alignment with said straight portion and spaced therefrom, and backing means approximately parallel with said path for counteracting the thrust of the teeth as they enter the sprocket holes, said backing means being spaced from the carrier a distance greater than the combined thickness of the films, whereby the films are pressed only part way down the teeth, leaving a slight clearance between the films and carrier.

21. In the art of feeding a plurality of cinematographic films on a carrier having teeth fitting the sprocket holes of the film to hold them in register with each other, the method which comprises bringing the films together in superposed contact with their sprocket holes substantially in register, feeding the superposed films along a rectilinear path from the point where the films are brought together to the point where the films meet the carrier, said rectilinear path being substantially tangential to the path of the carrier at the latter point, and after the films reach the latter point supporting the films on the carrier in intimate contact with each other.

22. In the art of feeding a plurality of cinematographic films on a carrier having teeth fitting the sprocket holes of the film to hold them in register with each other, the method which comprises causing said teeth to travel in an orbital path at least a portion of which is curved, bringing the films together in superposed contact with their sprocket holes substantially in register before they reach the carrier, feeding the superposed films along a rectilinear path from the point where the films are brought together to a point in said curved portion where the films meet the carrier, said rectilinear path being substantially tangential to said curved portion and codirectional with the path of the carrier and the films beyond said point and after the films reach the latter point supporting the films on the carrier in intimate contact with each other.

23. In the art of transferring a layer of picture-carrying medium from one cinematographic film base to another while the two bases are traveling in superposition on a carrier having a succession of register teeth which hold the bases in register by engagement in the sprocket holes of the film, the method which comprises bringing the films together in superposed contact with their sprocket holes substantially in register, feeding the superposed films along a rectilinear path from the point where the films are brought together to the point where the films meet the carrier, said rectilinear path being substantially tangential to the path of the carrier at the latter point, after the films reach said point supporting the films on the carrier in intimate contact with each other, while the two bases are traveling on the carrier in intimate contact with each other loosening the adhesive between the layer and original base and adhesively joining the outer face of the layer to the new base, and peeling the layer and original base apart.

24. In the art of transferring a layer of picture-carrying medium from one cinematographic film base to another while the two bases are traveling in superposition on a carrier having a succession of register teeth which hold the bases in register by engagement in the sprocket holes of the film, the method which comprises bringing the films together in superposed contact with their sprocket holes substantially in register, feeding the superposed films along a rectilinear path from the point where the films are brought together to the point where the films meet the carrier, said rectilinear path being substantially tangential to the path of the carrier at the latter point, said path being convex at this point, after the films reach said point supporting the films on the carrier in intimate contact with each other, while the two bases are traveling on the carrier in intimate contact with each other loosening the adhesive between the layer and original base and adhesively joining the outer face of the layer to the new base, and peeling the layer and original base apart.

25. In the art of transferring a layer of picture-carrying medium from one cinematographic film base to another while the two bases are traveling in superposition on a carrier having a succession of register teeth which hold the bases in register by engagement in the sprocekt holes of the film, the method which comprises bringing the films together in superposed contact with their sprocket holes substantially in register, feeding the superposed films along a rectilinear path from the point where the films are brought together to the point where the films meet the carrier, said rectilinear path being substantially tangential to the path of the carrier at the latter point and codirectional with the path of the carrier and the films beyond said point, after the films reach said point supporting the films on the carrier in intimate contact with each other, while the two bases are traveling on the carrier in intimate contact with each other loosening the adhesive between the layer and original base and adhesively joining the outer face of the layer to the new base, and peeling the layer and original base apart.

CHARLES D. BENNES.

REFERENCES CITED

The following references are of record in the file of this patent:

UNITED STATES PATENTS

| Number | Name | Date |
|---|---|---|
| 1,707,699 | Whitney | Apr. 2, 1929 |
| 1,853,445 | McClay | Apr. 12, 1932 |
| 2,328,492 | Rackett | Aug. 31, 1943 |
| 2,369,176 | Rackett | Feb. 13, 1945 |
| 2,415,442 | Rackett | Feb. 11, 1947 |
| 2,417,060 | Capstaff | Mar. 11, 1947 |
| 2,437,361 | Rackett | Mar. 9, 1948 |

FOREIGN PATENTS

| Number | Country | Date |
|---|---|---|
| 519,831 | Great Britain | Apr. 8, 1940 |